(12) United States Patent
Chelnokov et al.

(10) Patent No.: US 12,430,764 B2
(45) Date of Patent: *Sep. 30, 2025

(54) CT RECONSTRUCTION QUALITY CONTROL

(71) Applicant: James R. Glidewell Dental Ceramics, Inc., Newport Beach, CA (US)

(72) Inventors: Fedor Chelnokov, Khimki (RU); Grant Karapetyan, Moscow (RU)

(73) Assignee: James R. Glidewell Dental Ceramics, Inc., Newport Beach, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 18/365,389

(22) Filed: Aug. 4, 2023

(65) Prior Publication Data
US 2023/0394659 A1 Dec. 7, 2023

Related U.S. Application Data

(63) Continuation of application No. 17/219,243, filed on Mar. 31, 2021, now Pat. No. 11,721,017.

(51) Int. Cl.
*G06T 7/00* (2017.01)

(52) U.S. Cl.
CPC .. *G06T 7/0012* (2013.01); *G06T 2207/10081* (2013.01); *G06T 2207/20021* (2013.01); *G06T 2207/30036* (2013.01); *G06T 2207/30168* (2013.01)

(58) Field of Classification Search
CPC ......... G06T 7/0012; G06T 2207/10081; G06T 2207/20021; G06T 2207/30036; G06T 2207/30168

See application file for complete search history.

(56) References Cited

U.S. PATENT DOCUMENTS

| | | | |
|---|---|---|---|
| 5,224,037 | A | 6/1993 | Jones et al. |
| 6,343,108 | B1 | 1/2002 | Heuscher |
| 7,251,307 | B2 | 7/2007 | Chen |
| 7,277,595 | B1 | 10/2007 | Reid |
| 7,330,528 | B2 | 2/2008 | Jefferson |
| 7,940,884 | B2 | 5/2011 | Bruder et al. |

(Continued)

FOREIGN PATENT DOCUMENTS

| | | |
|---|---|---|
| EP | 0825457 A3 | 2/2002 |
| JP | 2005312970 A | 11/2005 |

(Continued)

OTHER PUBLICATIONS

A.C. Kak, Principles of Computerized Tomographic Imaging, IEEE Press, 1988. (Textbook).

(Continued)

*Primary Examiner* — Siamak Harandi
(74) *Attorney, Agent, or Firm* — Klarquist Sparkman, LLP

(57) ABSTRACT

A computer-implemented method, system, and instructions can include receiving a reconstructed volume of an object; determining an air density and a material density from the reconstructed volume of the object; subdividing the reconstructed volume into one or more blocks, each block comprising one or more voxels; determining one or more contrast blocks within the reconstructed volume; and determining a reconstruction quality based on the number of contrast blocks in the reconstructed volume.

20 Claims, 13 Drawing Sheets

(56) References Cited

U.S. PATENT DOCUMENTS

| | | |
|---|---|---|
| 8,723,866 B2 | 5/2014 | Buyanovskiy |
| 8,724,880 B2 | 5/2014 | Shiki et al. |
| 8,842,904 B2 | 9/2014 | Chen |
| 9,155,514 B2 | 10/2015 | Panin et al. |
| 9,235,889 B1 | 1/2016 | Frenkel et al. |
| 9,498,177 B2 | 11/2016 | Bruder et al. |
| 10,229,517 B2 | 3/2019 | Raupach et al. |
| 11,544,846 B2 | 1/2023 | Nikolskiy et al. |
| 2004/0170248 A1 | 9/2004 | Cahill |
| 2004/0183812 A1 | 9/2004 | Rasker et al. |
| 2007/0217567 A1 | 9/2007 | Noshi et al. |
| 2009/0169081 A1 | 7/2009 | Garms |
| 2010/0246918 A1 | 9/2010 | Kappler et al. |
| 2011/0002395 A1 | 1/2011 | Nishihara |
| 2011/0142316 A1 | 6/2011 | Wang et al. |
| 2011/0164031 A1 | 7/2011 | Shi |
| 2012/0170822 A1 | 7/2012 | Litvin et al. |
| 2014/0093030 A1 | 4/2014 | Mukumoto et al. |
| 2016/0095668 A1 | 4/2016 | Kuo et al. |
| 2016/0163073 A1 | 6/2016 | Grass et al. |
| 2017/0278281 A1* | 9/2017 | Schmitt ................. G06T 7/0012 |
| 2018/0028064 A1* | 2/2018 | Elbaz .................. G06F 16/9535 |
| 2018/0132982 A1 | 5/2018 | Nikolskiy et al. |
| 2018/0276854 A1 | 9/2018 | Suzuki et al. |
| 2019/0197674 A1 | 6/2019 | Bai et al. |
| 2020/0178910 A1 | 6/2020 | Susuki et al. |
| 2020/0205943 A1 | 7/2020 | Elbaz et al. |
| 2020/0380669 A1* | 12/2020 | Wu ....................... G06T 7/0002 |
| 2020/0405455 A1 | 12/2020 | Nikolskiy et al. |
| 2021/0077045 A1 | 3/2021 | Wen |
| 2021/0372950 A1 | 12/2021 | Nikolskiy et al. |
| 2022/0172411 A1 | 6/2022 | Chelnokov |
| 2022/0245867 A1 | 8/2022 | Chelnokov |

FOREIGN PATENT DOCUMENTS

| | | |
|---|---|---|
| WO | 2015014867 A1 | 2/2015 |
| WO | 2017191162 A1 | 11/2017 |
| WO | 2019183584 A1 | 9/2019 |

OTHER PUBLICATIONS

Lucia Franco et al., Integrating quality control tests in a computed tomography system, 11th European Conference on Non-Destructive testing (ECNDT 2014), Oct. 6-10, 2014, Prague, Czech Republic, in 9 pages.

International Application No. PCT/US22/22590, International Search Report and Written Opinion, mailed Jul. 7, 2022, in 14 pages.

International Application No. PCT/US22/22590, Preliminary Report, mailed Oct. 12, 2023, in 8 pages.

* cited by examiner

CT RECONSTRUCTION QUALITY CONTROL

CROSS-REFERENCE TO RELATED APPLICATIONS

This application is a continuation of U.S. patent application Ser. No. 17/219,243 filed on Mar. 31, 2021, which is herein incorporated by reference in its entirety.

BACKGROUND

A computed tomography scan ("CT scan") typically involves placing a physical object on a rotating platform inside a Computed Tomography scanner (CT scanner) between an x-ray source and x-ray detector and rotating the object around an axis of rotation to generate radiographs from the x-rays detected by the detector. Conventionally, the CT scanner can tomographically reconstruct the radiographs into a 3D representation of the object scanned ("CT reconstruction"). One example of CT reconstruction can be found in, for example, in the publication *Principles of Computerized Tomographic Imaging* (A. C. Kak and Malcolm Slaney, *Principles of Computerized Tomographic Imaging*, IEEE Press, 1988), the entirety of which is incorporated by reference herein. Other types of CT reconstruction can also be performed.

CT scanners are typically configured with calibration parameters which are provided to reconstruction algorithms to generate the reconstructed image. However, over time, CT scanners can be subject to factors that can alter physical component alignment and relationships between them. These factors can render the initial parameters ineffective to reconstruct an accurate or clear image. Accordingly, CT scanners can need calibration. However, it can be difficult and problematic to recognize when CT scanners need calibration in general, and also in automated systems where user oversight/interaction during the CT scanning process is limited.

SUMMARY

Disclosed is a computer-implemented method of reconstruction quality control that can include: receiving a reconstructed volume of an object; determining an air density and a material density from the reconstructed volume of the object; subdividing the reconstructed volume into one or more blocks, each block comprising one or more voxels; determining one or more contrast blocks within the reconstructed volume; and determining a reconstruction quality based on the number of contrast blocks in the reconstructed volume.

Disclosed is a system of reconstruction quality control that can include: a processor; a computer-readable storage medium comprising instructions executable by the processor to perform steps that can include: receiving a reconstructed volume of an object; determining an air density and a material density from the reconstructed volume of the object; subdividing the reconstructed volume into one or more blocks, each block comprising one or more voxels; determining one or more contrast blocks within the reconstructed volume; and determining a reconstruction quality based on the number of contrast blocks in the reconstructed volume.

Disclosed is a non-transitory computer readable medium storing executable computer program instructions for reconstruction quality control, the computer program instructions comprising instructions for: receiving a reconstructed volume of an object; determining an air density and a material density from the reconstructed volume of the object; subdividing the reconstructed volume into one or more blocks, each block comprising one or more voxels; determining one or more contrast blocks within the reconstructed volume; and determining a reconstruction quality based on the number of contrast blocks in the reconstructed volume.

DETAILED DESCRIPTION

Figure 1:
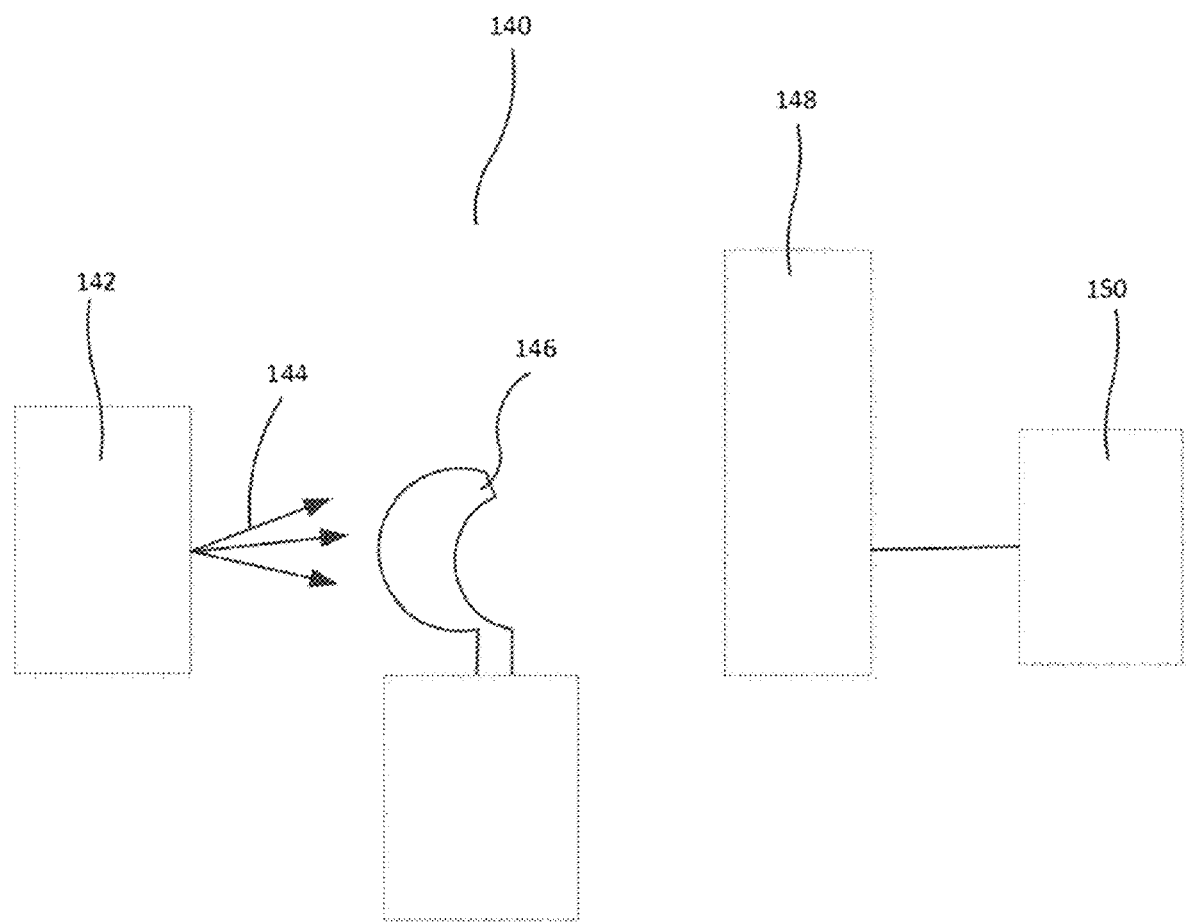
FIG. 1 shows a schematic diagram of a computed tomography (CT) scanning system.

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "can include." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as "lowest," "best," "minimum," or the like. It will be appreciated that such descriptions are intended to indicate that a selection among many alternatives can be made, and such selections need not be better, smaller, or otherwise preferable to other selections.

In the following description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Some embodiments of the present disclosure can include a computer-implemented method of reconstruction quality control. Some embodiments of the computer-implemented method can include receiving a reconstructed volume of an object. In some embodiments, the reconstructed volume is a CT reconstructed volume.

A computed tomography (CT) scanner uses x-rays to make a detailed image of an object. A plurality of such images are then combined to form a 3D model of the object. A schematic diagram of an example of a CT scanning system 140 is shown in FIG. 1. The CT scanning system 140 includes a source of x-ray radiation 142 that emits an x-ray beam 144. An object 146 being scanned is placed between the source 142 and an x-ray detector 148. In some embodiments, the object can be any object that can, for example, fit in a CT scanning system and be penetrated by x-rays. The x-ray detector 148, in turn, is connected to a processor 150 that is configured to receive the information from the detector 148 and to convert the information into a digital image file. Those skilled in the art will recognize that the processor 150 may comprise one or more computers that may be directly connected to the detector, wirelessly connected, connected via a network, or otherwise in direct or indirect communication with the detector 148.

An example of a suitable scanning system 140 includes a Nikon Model XTH 255 CT Scanner (Metrology) which is commercially available from Nikon Corporation. The example scanning system includes a 225 kV microfocus x-ray source with a 3 µm focal spot size to provide high performance image acquisition and volume processing. The processor 150 may include a storage medium that is configured with instructions to manage the data collected by the scanning system. A particular scanning system is described for illustrative purposes; any type/brand of CT scanning system can be utilized.

Figure 2:
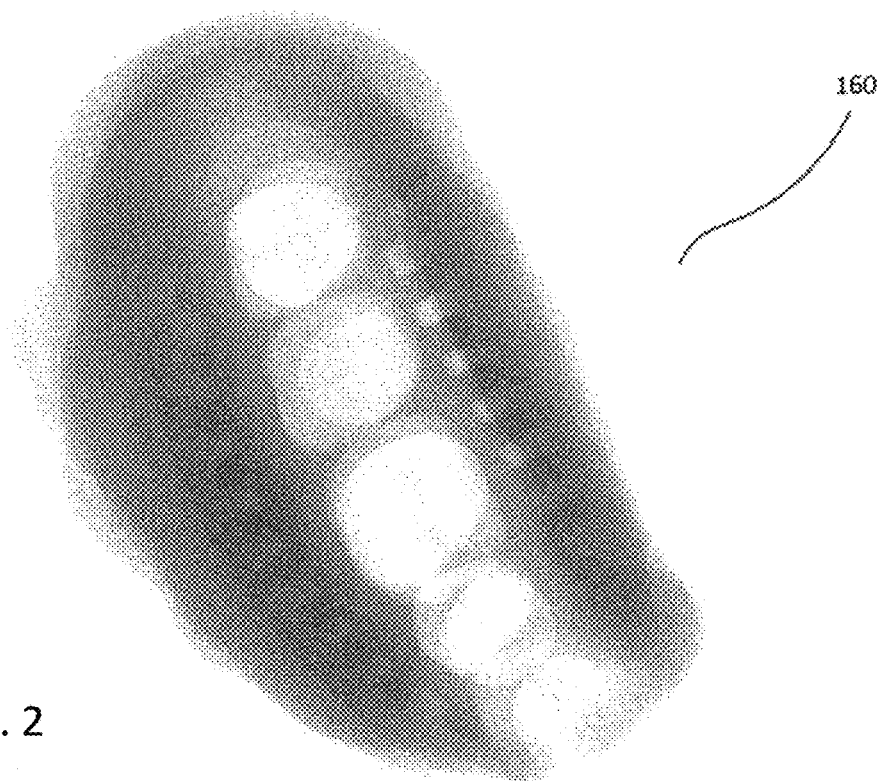
FIG. 2 shows a 2-dimensional (2D) radiographic image of a dental impression tray containing a dental impression.

One example of CT scanning is described in U.S. Patent Application No. US20180132982A1 to Nikolskiy et al., which is hereby incorporated in its entirety by reference. As noted above, during operation of the scanning system 140, the object 146 is located between the x-ray source 142 and the x-ray detector 148. A series of images of the object 146 are collected by the processor 150 as the object 146 is rotated in place between the source 142 and the detector 146. An example of a single radiograph 160 is shown in FIG. 2. The radiograph 160 and all radiographs described herein are understood to be digital. In one embodiment, a series of 720 images can be collected as the object 146 is rotated in place between the source 142 and the detector 148. In other embodiments, more images or fewer images may be collected as will be understood by those skilled in the art. In some embodiments, radiographs can be referred to as projection images.

Figure 3:
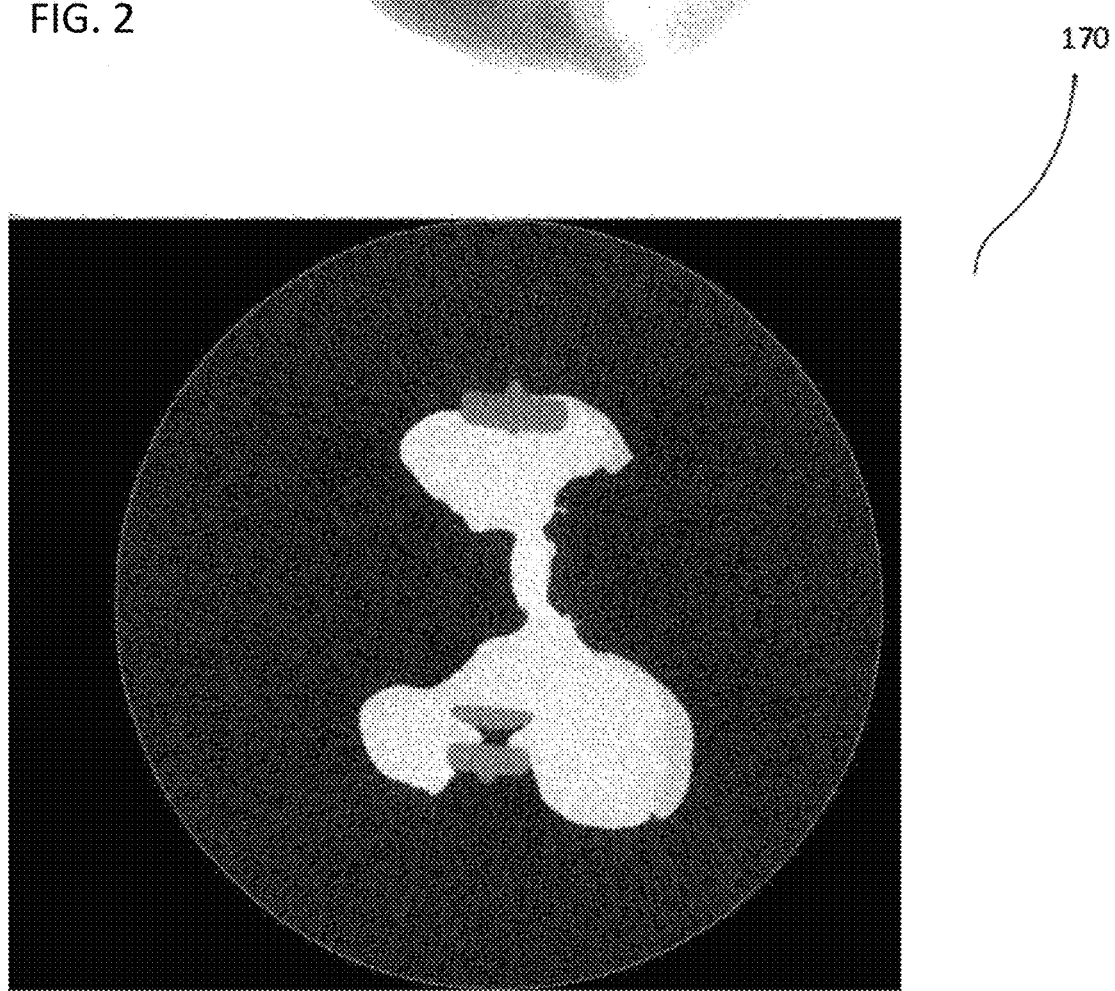
FIG. 3 shows a cross-section of a 3-dimensional (3D) volumetric image.

The plurality of radiographs 160 of the object 146 are generated by and stored within a storage medium contained within the processor 150 of the scanning system 140, where they may be used by software contained within the processor to perform additional operations. For example, in an embodiment, the plurality of radiographs 160 can undergo tomographic reconstruction in order to generate a 3D virtual image 170 (see FIG. 3) from the plurality of 2D radiographs 160 generated by the scanning system 140. In the embodiment shown in FIG. 3, the 3D virtual image 170 is in the form of a volumetric image or volumetric density file (shown in cross-section in FIG. 3) that is generated from the plurality of radiographs 160 by way of a CT reconstruction algorithm associated with the scanning system 140. One type of CT reconstruction algorithm can be the filtered backprojection algorithm as described in the *Principles of Computerized Tomographic Imaging* publication. Other types of CT reconstruction algorithms known in the art can also be used.

A reconstructed image of a scanned object can include one or more object material voxels, air voxels, and other material voxels. As discussed previously, incorrect CT scanner calibration parameters can distort the reconstructed volume. One example of CT scanner calibration parameters can be found in U.S. Utility patent application Ser. No. 16/887,437 of Nikolskiy et al., filed May 29, 2020, the entirety of which is hereby incorporated by reference. A distorted reconstructed volume can occur, for example, because in some cases, the reconstruction algorithm generates a disproportionate number of non-air and non-object voxels in the reconstructed volumetric image, thereby distorting or blurring the reconstructed volumetric image. In some embodiments, the number of non-air and non-object material voxels in distorted or blurred reconstructed images can be greater than in undistorted or good reconstructed images. In some cases, the distorted/blurry reconstructed image can be caused by incorrect CT scanner calibration parameters that are used in the reconstruction algorithm. In some cases, blurry reconstructed volumes can also occur where an object is not properly fixed to the rotating platform and therefore moves unexpectedly during CT scanning.

In some embodiments, the object can be any object that can fit within a CT scanning system, for example. In some embodiments, the object can be any object used in the field of medicine and/or dentistry. In some embodiments, the object can be a physical dental impression, for example. In some embodiments, the dental impression can include a triple-tray impression. In some embodiments, the dental impression can include an arch impression.

In some embodiments, the computer-implemented method can determine an air density and a material density of the object from the reconstructed volume. In some embodiments, the material density can be of the object scanned. In some embodiments, the material density can include a dental impression material's density. In some embodiments, the air and/or the material density is set by a user in a configuration file. In some embodiments, the air and/or material density is determined automatically from a histogram.

In some embodiments, the histogram can provide a frequency distribution of material densities in a scan volume. In some embodiments, the volumetric file can be received by the computer-implemented system. The volumetric density file contains voxels having density information of one or more materials and surrounding air in a CT scan volume. The number of voxels at a particular density value can represent the amount of the material/air having that particular density.

Figure 4A:
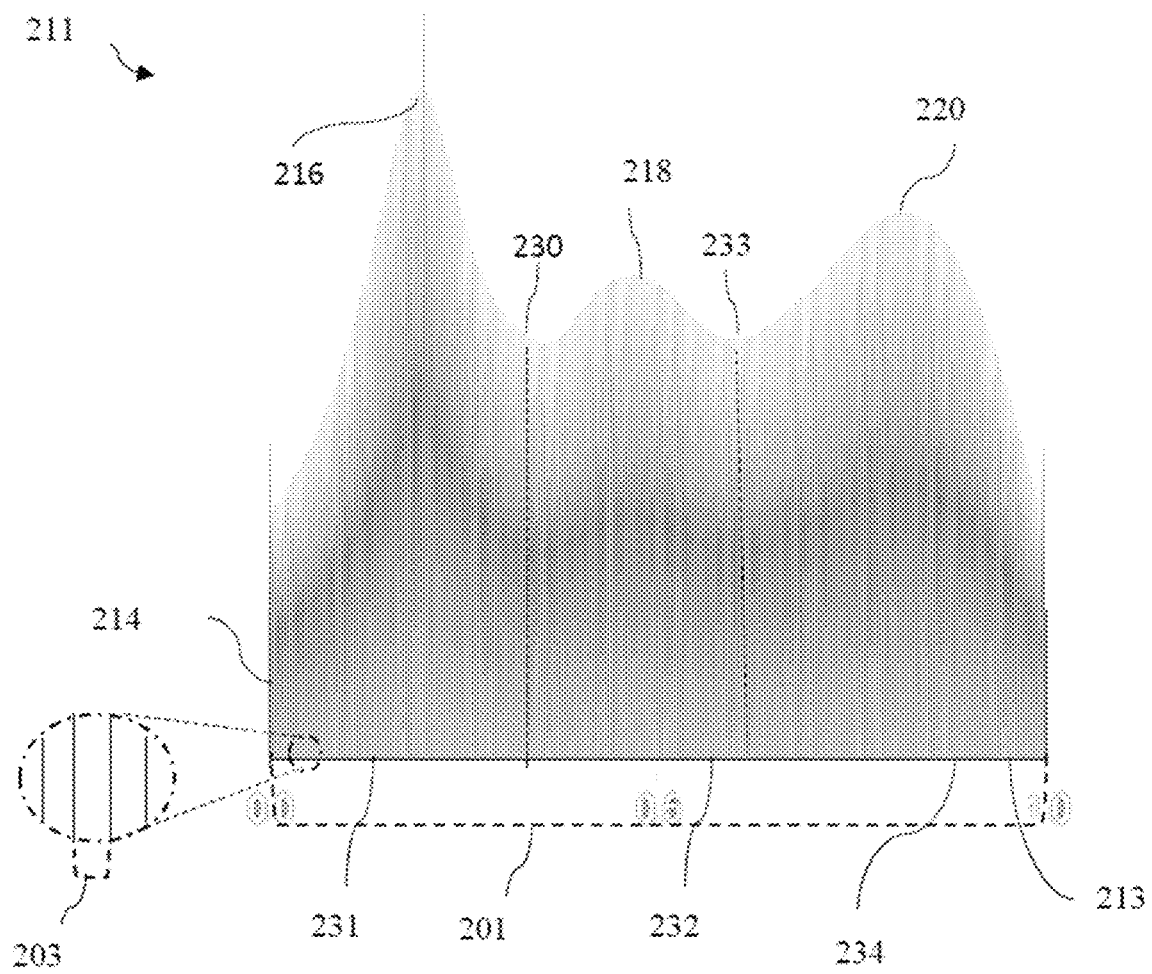
FIGS. 4(*a*)-4(*b*) are histograms illustrating a density frequency distribution.

As illustrated in the histogram 211 of FIG. 4(a), in some embodiments, the computer-implemented method can generate a density frequency distribution of the volumetric density file. The histogram 211 is shown for illustrative purposes and includes an x-axis 213 of density values and the y-axis 214 of the number of voxels (voxel counts), for example. All histograms illustrating the density frequency distribution herein include an x-axis of density values and a y-axis of the number of voxels (voxel counts). The computer-implemented method can receive a volumetric density file. The computer-implemented method can generate a normalized scan density range 201 for the volumetric density file. For example, in some embodiments, the computer-implemented method can generate the normalized scan density range 201 to be between 0.0 and 1.0. The computer-implemented method can subdivide the normalized scan density range into one or more scan density subranges 203 (scan density subrange 203 is shown among multiple scan density subranges in a magnified view). For example, the computer-implemented method can subdivide the normalized scan density range 201 of 0.0 and 1.0 into multiple scan density subranges 203. In some embodiments, the number of scan density subranges 203 can be 500, for example. In some embodiments, more or fewer scan density subranges 203 are possible. For each voxel, the computer-implemented method normalizes the density value of the voxel to fall within the normalized scan density range 201. The computer-implemented method compares the normalized density of the voxel with the one or more scan density subranges 203 and increments the voxel count for the scan density subrange 203 within which the normalized voxel density value falls. The computer-implemented method loads the next voxel from the volumetric density file and repeats the process for every voxel in the volumetric density file to determine the total voxel count for each of the scan density subranges 203. In some embodiments, the computer-implemented method takes a logarithm of the voxel counts for each scan density subrange 203. The computer-implemented method in this manner generates the density frequency distribution which is depicted as histogram 211 for illustrative purposes.

In some scans, air occupies most of the CT scan volume. This can occur, for example, in CT scans where the object being scanned occupies a smaller volume of the CT scan than air. In the case of dental impressions, for example, this can include triple tray impressions or other dental impressions whose impression material occupies a smaller volume of the CT scan volume than air. In such scans, since air has the highest volume, the number of voxels with a density value falling within the density range of air is highest. In some embodiments, the number of voxels with a density value falling within the density range of the object or the impression material in the case of dental impressions can be the lowest. In some embodiments, the dental impression can include a handle, which occupies the least volume, so that the impression material occupies the second highest volume in the CT scan volume next to air. The number of voxels having a density falling within the density range of the impression material can therefore be the second highest. Similarly, other materials such as the handle can constitute the least amount of material and therefore occupy the least volume in the CT scan volume. The number of voxels having a density falling within the density range of the handle material can therefore have the lowest voxel count.

In another example, the particular object being scanned or the dental impression material can occupy most of the CT scan volume. In the case of dental impressions, this can occur in CT scans of full arch impressions, for example, or other dental impressions whose impression material occupies more of the CT scan volume than air. In such scans, the impression material of the dental impression can occupy the most volume in the CT scan volume. The number of voxels having a density value falling within the density range of the object or the impression material can therefore be the highest voxel count. The number of voxels having a density value falling within the density range of air can therefore be the lowest voxel count. In case of a dental impression that includes a handle, the air in such a scan can occupy the second highest volume in the CT scan volume. The number of voxels having a density falling within the density range of air can therefore be the second highest voxel count. Similarly, other materials such as the handle can constitute the least amount of material in the CT scan so that the number of voxels having a density falling within the density range of the handle material can have the lowest voxel count.

In some embodiments, the computer-implemented method is provided the type of object scanned. This can include, for example, whether the object being scanned occupies the most volume or air occupies the most volume. In the case of dental impressions, the value can be determined from the type of scan performed. For example, if a triple-tray dental impression scan was performed, the computer-implemented method can determine that air will occupy the highest scan volume (and therefore the most voxels), the impression material will occupy the second highest volume (and therefore the second most number of voxels), and that the handle will occupy the least volume (and therefore the least number of voxels) in some embodiments. For example, if a full arch dental impression scan was performed, the computer-implemented method can determine that the impression material will occupy the highest scan volume (and therefore the most voxels), air will occupy the second highest volume (and therefore the second most number of voxels), and that the handle will occupy the least volume (and therefore the least number of voxels) in some embodiments.

In some embodiments, the computer-implemented method can determine the air density and the object material density (such as, for example, impression material density) based on voxel counts in the density frequency distribution. In some embodiments, the computer-implemented method can use voxel counts to determine one or more voxel count peaks as the highest voxel counts in the density frequency distribution. For example, the computer-implemented method can compare the voxel counts at each scan density subrange and determine which scan density subrange the voxel count either switches from increasing to decreasing, or begins decreasing. In some embodiments, a voxel count peak can span one or more scan density subranges. Other techniques can be used to determine voxel count peaks in the density frequency distribution. In some embodiments, a voxel count peak can span one or more scan density subranges. In some embodiments, the number of peaks in the density frequency distribution is proportional to the number of materials plus air in the CT scan volume, for example. In some embodiments, the valleys are arranged between two voxel count peaks.

For example, as illustrated in FIG. 4(a), the computer-implemented method can generate a density frequency distribution which is illustrated in the histogram 211. The computer-implemented method can determine a highest voxel count peak 216, second highest voxel count peak 220, and third voxel count peak 218, for example. Additional voxel count peaks can also be present and determined by the computer-implemented method. As discussed previously, highest voxel count peak 216, second highest voxel count peak 220, third voxel count peak 218 and any other peaks herein can span one or more scan density subrange(s). The peaks can be separated by a first valley 230 between the highest voxel count peak 216 and the second highest voxel count peak 220, and a second valley 233 between the second highest voxel count peak 220 and the third highest voxel count peak 218. The valleys can define a highest peak density range 231, a second highest peak density range 234, and a lowest peak density range 232, for example.

Figure 4B:
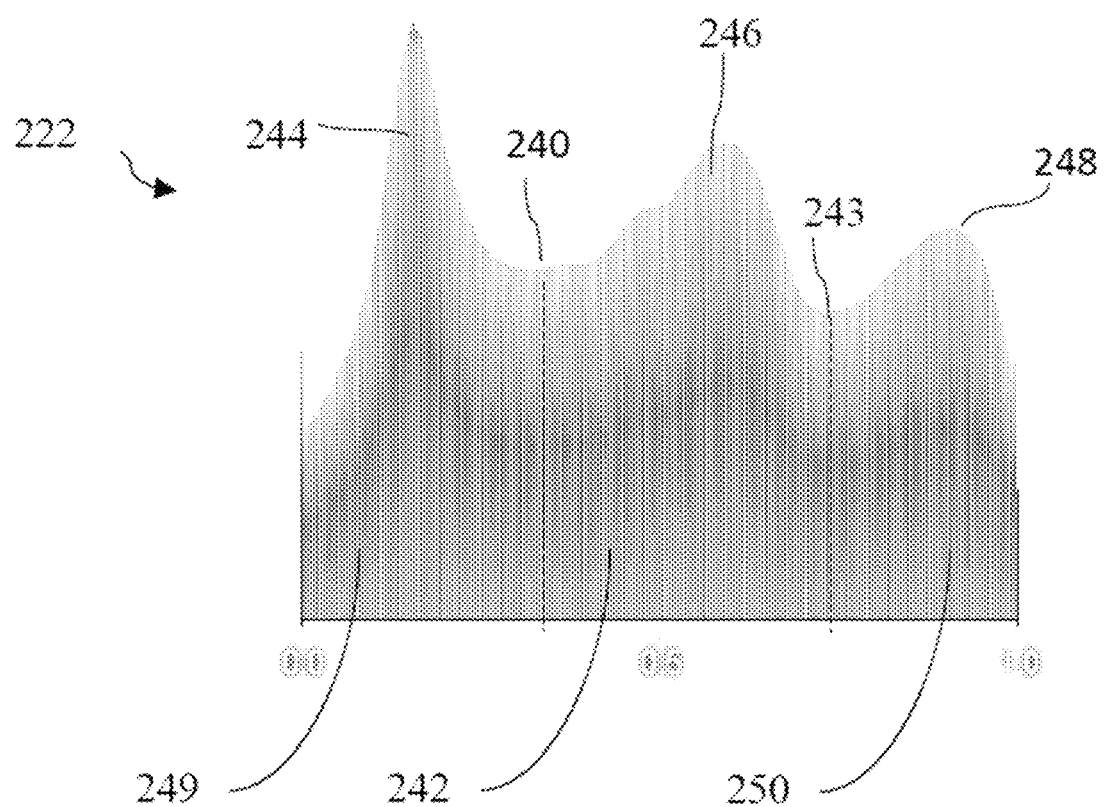

The computer-implemented method receives a volumetric density file and generates a density frequency distribution. The computer-implemented method receives information regarding a type of impression or object scanned. The computer-implemented method determines whether air or the object material (or impression material) occupies the most volume of the CT scan volume based on the type of impression or object scanned. In some embodiments, the computer-implemented method determines air occupies the most volume if the impression type is a triple tray impression, for example. In some embodiments, the computer-implemented method determines the object material (impression material) occupies the most volume if the impression type is a full arch impression, for example. The computer-implemented method determines voxel count peaks in the density frequency distribution. If the computer-implemented method determines that air occupies most of the CT scan volume and the object material (or impression material) occupies the second highest volume based on the type of impression scanned, the computer-implemented method determines the air density as the one or more density subranges of the highest voxel count peak and the object material (or impression material) density as the one or more density subranges of second highest voxel count peak. If the computer-implemented method determines that an object material (or impression material) occupies most of the CT scan volume and air occupies the second most based on the type of impression scanned, the computer-implemented method determines the object material (or impression material) density as the one or more density subranges of the highest voxel count peak and the air density as the one or more density subranges of the second highest peak. In some embodiments, the example of FIG. 4(a), air occupies the most CT scan volume. The computer-implemented method can determine that the highest peak density range 231 is the air density and the second highest peak density range 234 is the object material (or impression material) density. FIG. 4(b) illustrates another example in which the other material such as the handle, for example, has a greater density than the object material (or impression material). In FIG. 4(b), air occupies the most CT scan volume. The computer-implemented method generates a density frequency distribution as represented by histogram 222 for illustrative purposes. The density frequency distribution can include a highest voxel count peak 244, a second highest voxel count peak 246, and a third highest voxel count peak 248. The computer implemented-method determines that air occupies the most CT scan volume. The computer-implemented method determines the air density as the highest voxel count peak 244 and the object material (or impression material) density as the second highest voxel count peak 246. In some embodiments, total voxel counts in the density ranges can be used instead of voxel count peaks to determine the air density and the object material (or impression material) density. For example, in some embodiments, the computer-implemented method receives a volumetric density file and generates a density frequency distribution. The computer-implemented method receives information regarding a type of impression scanned. The computer-implemented method determines whether air or the object material (or impression material) occupies the most volume of the CT scan volume based on the type of impression scanned. In some embodiments, the computer-implemented determines air occupies the most volume if the impression type is a triple tray impression. In some embodiments, the computer-implemented determines the object material (or impression material) occupies the most volume if the impression type is a full arch impression. The computer-implemented method determines voxel count peaks in the density frequency distribution. The computer-implemented method determines one or more voxel count valleys between the voxel count peaks. The computer-implemented method determines one or more density ranges between the valleys, between 0.0 or the minimum density value of the normalized density range and a first valley, and between the last valley and the maximum density value of the normalized density range. The computer-implemented method calculates a density range voxel count for each of the one or more density ranges. In some embodiments, the computer-implemented method can count the total number of voxels in each of the one or more density ranges. In some embodiments, the computer-implemented method can perform an integration on a curve that connects the voxel count peaks within each of the one or more density ranges. If the computer-implemented method determines air occupies most of the CT scan volume and the object material (or impression material) occupies the second highest volume based on the type of impression scanned, the computer-implemented method determines the air density as the highest voxel count density range and the object material (or impression material) density as the second highest voxel count density range. If the computer-implemented method determines that an object material (or impression material) occupies most of the CT scan volume and air occupies the second most based on the type of impression scanned, the computer-implemented method determines the air density as the second highest voxel count density range and the object material (or impression material) density as the highest voxel count density range. For example, the computer-implemented method generates a density frequency distribution illustrated as histogram 211 in FIG. 4(a) as described previously. As shown in FIG. 4(a), the computer-implemented method determines voxel count peaks 216, 218, and 220 and valleys 230 and 233, thereby establishing density ranges between density value 0.0 and density value at first valley 230, between density value at first valley 230 and density value at second valley 233, and between density value at second valley 233 and the maximum normalized density value. In this example, the maximum normalized density value is 1.0, for example. The computer-implemented method can determine the total number of voxels between density value 0.0 and the first valley 230, between the first valley 230 and the second valley 233, and the total number of voxels between the second valley 233. In the example of FIG. 4(a), if the computer-implemented method receives information that the dental impression type is a triple tray, then the computer-implemented determines that the highest voxel count density range corresponds to air. For example, if the density range between 0.0 and the first valley 230 contains the highest voxel count density range, then the computer-implemented method determines that density range as an air density. If the density range between the second valley 233 and the maximum normalized density range value of 1.0 contains the second highest voxel count density range for example, then the computer-implemented method determines that density range as the object material (or impression material) density. Similarly, as illustrated in the example of FIG. 4(b), the computer-implemented method can generate a density frequency distribution as described previously, the computer-implemented method determines voxel count peaks 244, 246, and 248 and valleys 240 and 243, thereby establishing density ranges between density value 0.0 and density value at first valley 240, between density value at first valley 240 and density value at second valley 243, and between density value at second valley 243 and the maximum normalized density value. In this example, the maximum normalized density value is 1.0, for example. The computer-implemented method can determine the total number of voxels between density value 0.0 and the first valley 240 as total voxel count 249, between the first valley 240 and the second valley 243 as total voxel count 242, and the total number of voxels after the second valley 243 as total voxel count 250. In this example, if the computer-implemented method receives information that the dental impression type is a triple tray, then the computer-implemented determines that the highest voxel count density range will correspond to air. For example, if the total voxel count 249 is the highest voxel count density range, then the computer-implemented method determines that the density range between 0.0 and the first valley 240 as an air density. If the total voxel count 242 is the second highest voxel count density range for example, then the computer-implemented method determines that the density range between the first valley 240 and the second valley 243 is the object material (or impression material) density. In some embodiments as illustrated in the examples, the computer-implemented method determines density range voxel counts by calculating an area beneath the voxel count curve extending between the particular density range endpoints. For the example of FIG. 4(a), the computer-implemented method can determine an area beneath the curve defined by the voxel counts between 0.0 and the density value at first valley 230 to determine the total voxel count for that density range. The computer-implemented method can determine an area beneath the curve defined by the voxel counts between the density value at first valley 230 and the density value at the second valley 233 to determine the total voxel count for that density range. the computer-implemented method can determine an area beneath the curve defined by the voxel counts between the density value at the second valley 233 and the highest density of the normalized density range to determine the total voxel count for that density range. The same method steps can be applied to the example of FIG. 4(b) and of any density frequency distribution, for example. In some embodiments, these areas beneath the curves can be calculated by performing integration on the respective curve with limits corresponding to the density value endpoints of a particular density range.

In some embodiments, the air and/or material density is determined automatically from a histogram per scan.

In some embodiments, the computer-implemented method can subdivide the reconstructed volume into one or more blocks, each block having one or more voxels. In some embodiments, the blocks can be cubical. In some embodiments, a block size can be a user configurable value. In some embodiments, the block size is 0.5 mm*0.5 mm*0.5 mm, for example. Other suitable block sizes are contemplated and can be used as well. In some embodiments, the computer-implemented method subdivides the entire reconstructed volume into multiple blocks.

Figure 5:
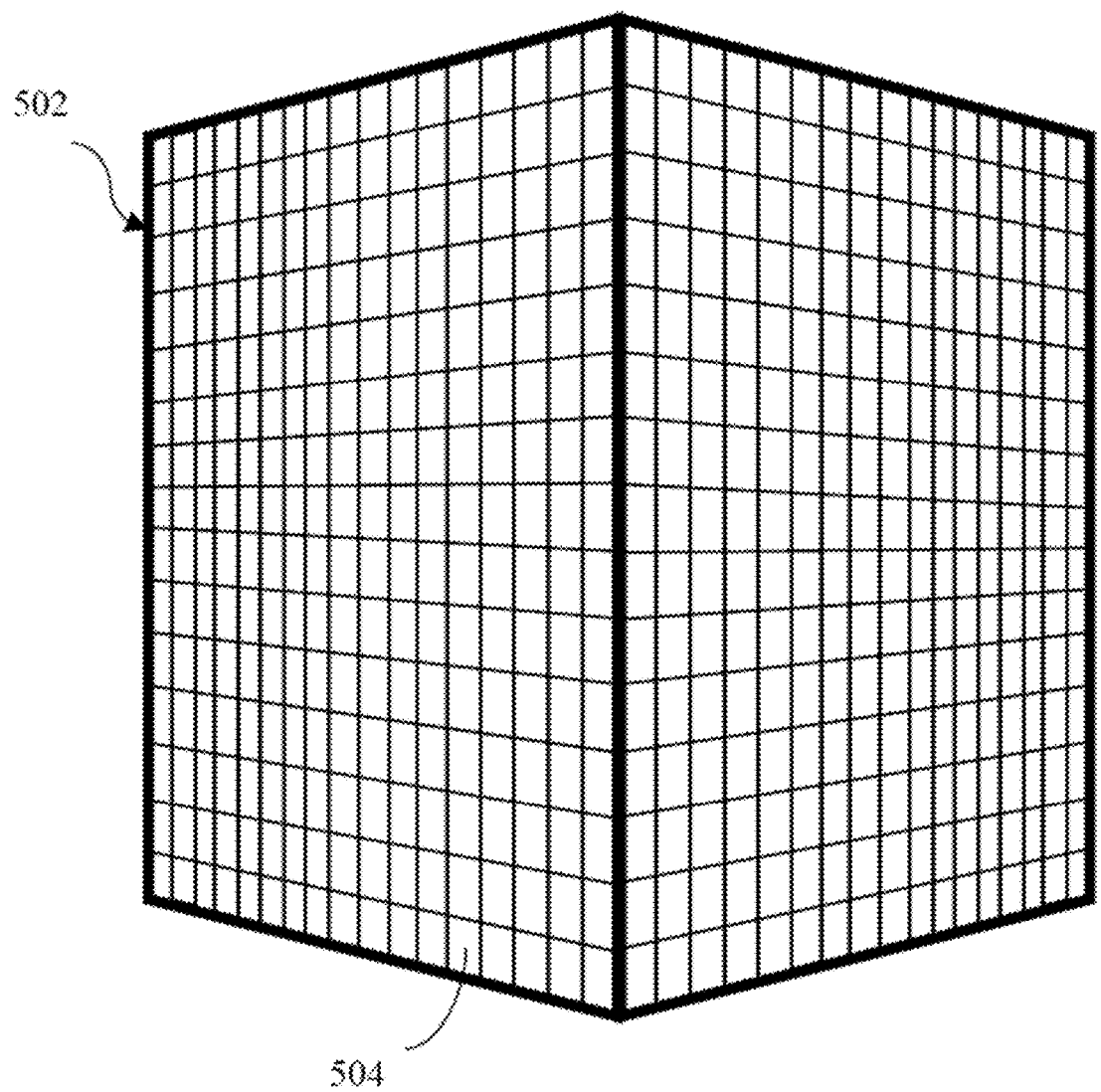
FIG. 5 shows a perspective view of an illustration of an example 3D reconstructed image in some embodiments.

FIG. 5 illustrates an example of reconstructed volume 502. The reconstructed volume can include one or more voxels representing density information at the location of the voxel in the reconstructed volume. In some embodiments, the computer-implemented method can in some embodiments divide the entire reconstructed volume into one or more three dimensional blocks such as block 504. In some embodiments, each block is cubical. In some embodiments, all of the blocks have the same dimensions. The number of blocks shown in FIG. 5 is for illustration purposes only; the computer-implemented method can generate more or fewer blocks.

Some embodiments of the computer-implemented method can include determining one or more contrast blocks within the reconstructed volume. In some embodiments, the determining one or more contrast blocks can include determining an air voxel count and a material voxel count in each of the one or more blocks. For example, in some embodiments, the air voxel count can include the number of voxels having a density below or equal to the air density. In some embodiments, the material voxel count can include the number of voxels having a density above or equal to the material density.

Figure 6A:
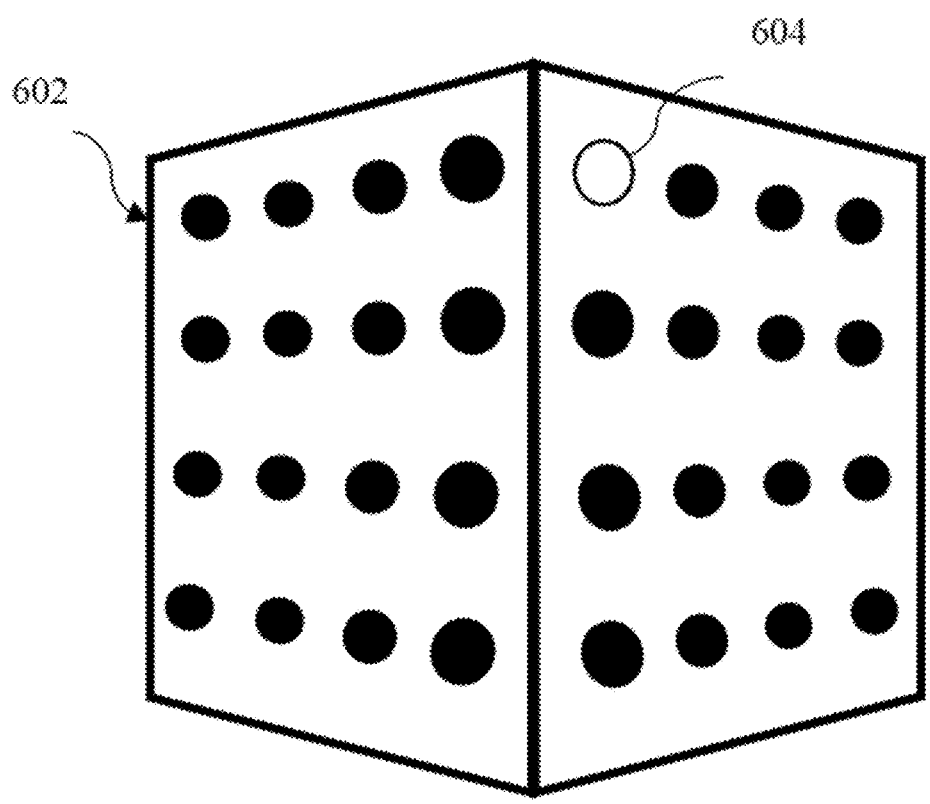
FIGS. 6(*a*)-6(*c*) show perspective views of illustrations of examples of a single block in 3D.
Figure 6B:
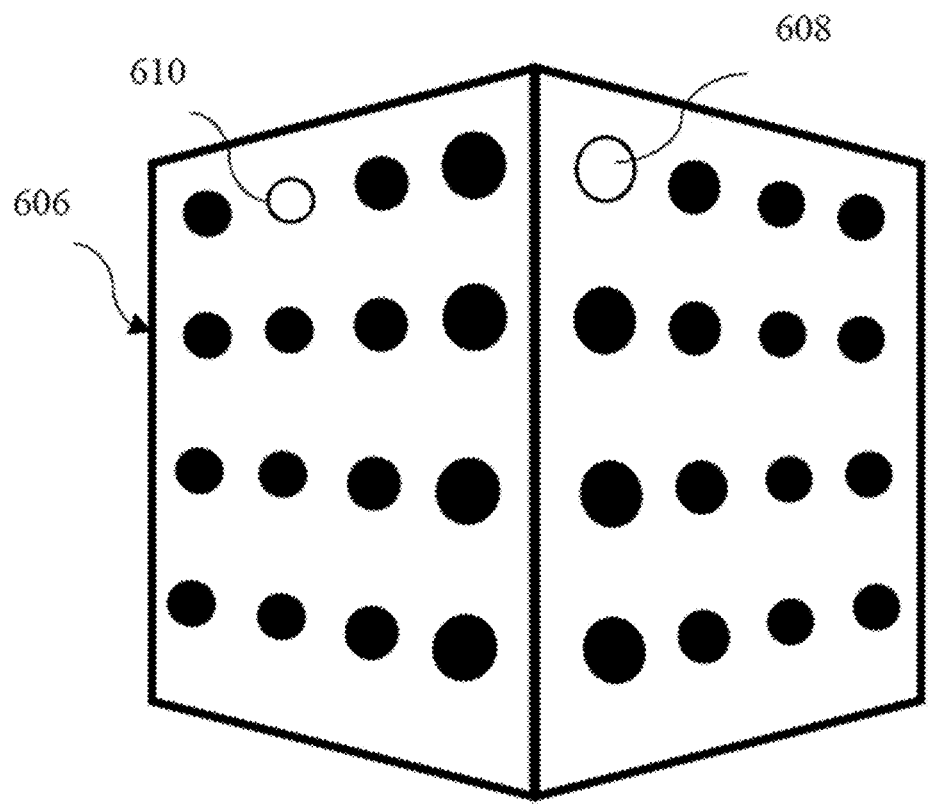
Figure 6C:
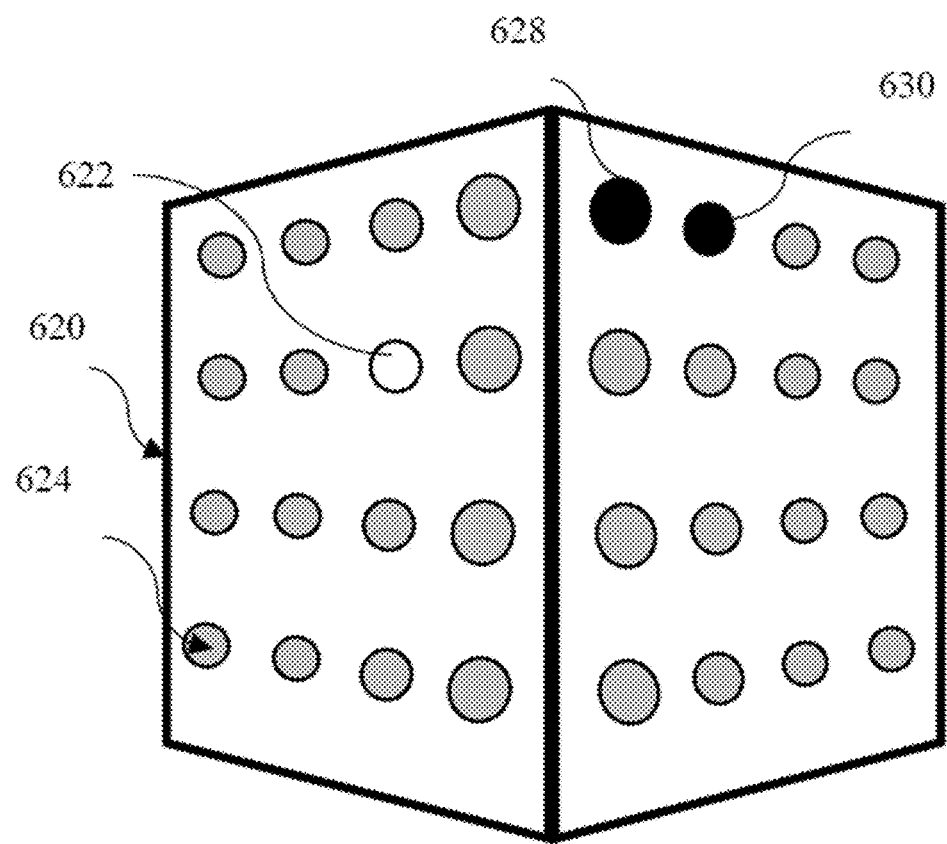

FIG. 6(a) illustrates an example of a single block 602 from FIG. 5, for example. Each block can contain one or more voxels in some embodiments. In some embodiments, a block can contain no voxels, for example. In some embodiments, the computer-implemented method can determine one or air voxel counts and material voxel counts. For example, in FIG. 6(a), the single block 602 can include a single air density voxel 604. In this example, the remaining voxels are material density voxels. If the total number of voxels in the single block 602 is 64, for example, then 63 voxels would be material density voxels. In the example, the air voxel count for the single block 602 would be 1, and the material voxel count would be 63. In the example of FIG. 6(b), the single block 606 can include a first air density voxel 608 and a second air density voxel 610. In this example, the remaining voxels are material density voxels. If the total number of voxels in the single block 606 is 64, for example, then 62 voxels would be material density voxels. In the example, the air voxel count for the single block 606 would be 2, and the material voxel count would be 62. In the example of FIG. 6(c), the single block 620 can include an air density voxel 622, a first object material density voxel 628, and a second object material density voxel 630. The remaining voxels remaining voxels 624 are neither air nor object material density voxels. If the total number of voxels in the single block 620 is 64, for example, then the air voxel count for the single block 620 would be 1, and the object material voxel count would be 2, and other material density voxels would be 61.

In some embodiments, a contrast block can include a block where both a fraction of air voxels and a fraction of material voxels is greater than a contrast block threshold value of all voxels within the block. In some embodiments, the threshold value can be 2%, as one example. Other suitable threshold values are contemplated and can be used. In the example of FIG. 6(a), the fraction of air voxels is 1/64, or 1.6%, and the fraction of material voxels is 63/64, or 98%. If the threshold value is set to 2%, for example, then the single block 602 would have air voxel count below the threshold value and material voxel counts above the threshold. In the example, the computer-implemented method would determine that the single block 602 is not a contrast block. In the example of FIG. 6(b), the fraction of air voxels is 2/64, or 3.1%, and the fraction of material voxels is 62/64, or 97%. If the threshold value is set to 2%, for example, then the single block 606 would have air voxel count above the threshold value and material voxel counts above the threshold. In the example, the computer-implemented method would determine that the single block 606 is a contrast block. In the example of FIG. 6(c), the fraction of air voxels is 1/64, or 1.6%, and the fraction of object material voxels is 2/64, or 3.1%. If the threshold value is set to 2%, for example, then the single block 620 would have air voxel count below the threshold value and material voxel counts above the threshold. In the example, the computer-implemented method would determine that the single block 620 is not a contrast block.

Although there are 64 voxels illustrated in the single block 602, the single block 606, and the single block 620, more or fewer voxels can be present in the blocks. In some embodiments, the computer-implemented method can process every block in the reconstructed volume to determine whether a particular block is a contrast block.

Some embodiments of the computer-implemented method can include determining a reconstruction quality based on the number of contrast blocks in the reconstructed volume. In some embodiments, the reconstruction quality determines whether the reconstruction should be kept. In some embodiments, the reconstruction quality is good where the number of contrast blocks in the reconstructed volume is greater than a reconstruction pass value. In some embodiments, the reconstruction pass value is a user-configurable value.

Figure 7:
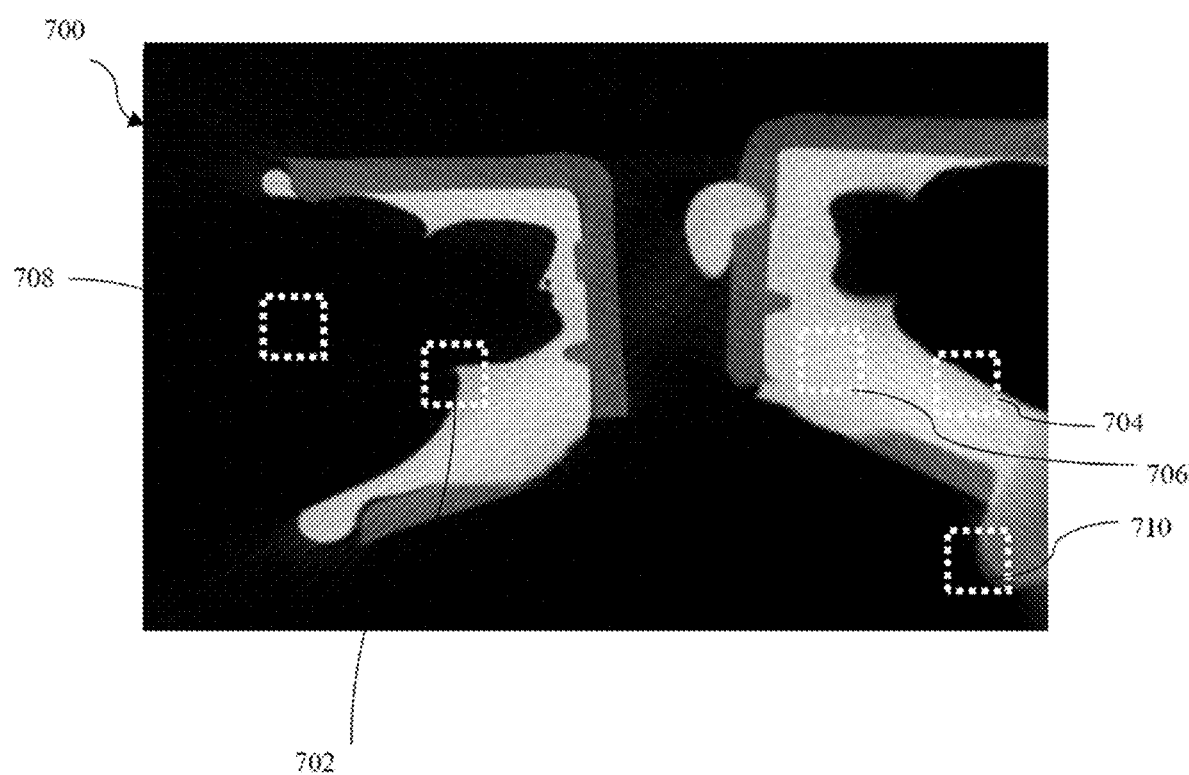
FIG. 7 shows an example of a slice of a reconstructed image showing regions of high contrast.

In some embodiments, the reconstruction pass value can be stored in a user-configurable file. In some embodiments, the reconstruction threshold pass value can be 30 blocks, as one example. Other suitable reconstruction threshold pass values are contemplated and can be used instead. For example, if the computer-implemented method determines that at least 30 of the blocks in FIG. 5 are contrast blocks, then the computer-implemented method can determine that reconstruction quality of the reconstructed volume 502 contains sufficient contrast and therefore is a good reconstruction, and that the reconstructed volume 502 should be kept. In such a case, the computer-implemented method can allow further processing to continue. One example of good reconstruction quality based on contrast blocks can be seen in FIG. 7, which illustrates one horizontal slice of a reconstructed volume image 700, for example. In the figure, the dark regions can represent one or more air voxels, for example, white regions can represent one or more object material voxels, for example, with the rest belonging to other material regions. Contrast blocks contain both object material voxels and air voxels in a user-configurable threshold value. Illustrated in the figure are sample five blocks. These blocks are shown only for reference, and do not necessarily appear in the reconstructed volume. As can be seen, the reconstructed image can contain contrast blocks such as a first contrast block 702, and a second contrast block 704, which can correspond to air in some embodiments, for example. The reconstructed image can also contain non-contrast blocks such as first non-contrast block 706, second non-contrast block 708, and third non-contrast block 710

Figure 8:
FIG. 8 shows an example of a slice of a reconstructed image that is blurry due to below threshold value number of contrast blocks.

In some embodiments, the reconstruction quality is blurry where the number of contrast blocks in the reconstructed volume is less than the reconstruction pass value. FIG. 8 illustrates an example of a reconstructed volume slice 802 showing the reconstructed volume having fewer contrast blocks than the reconstruction pass value. As can be seen, the reconstructed image is distorted, blurry or unclear, with little distinction between an object and air.

Figure 9:
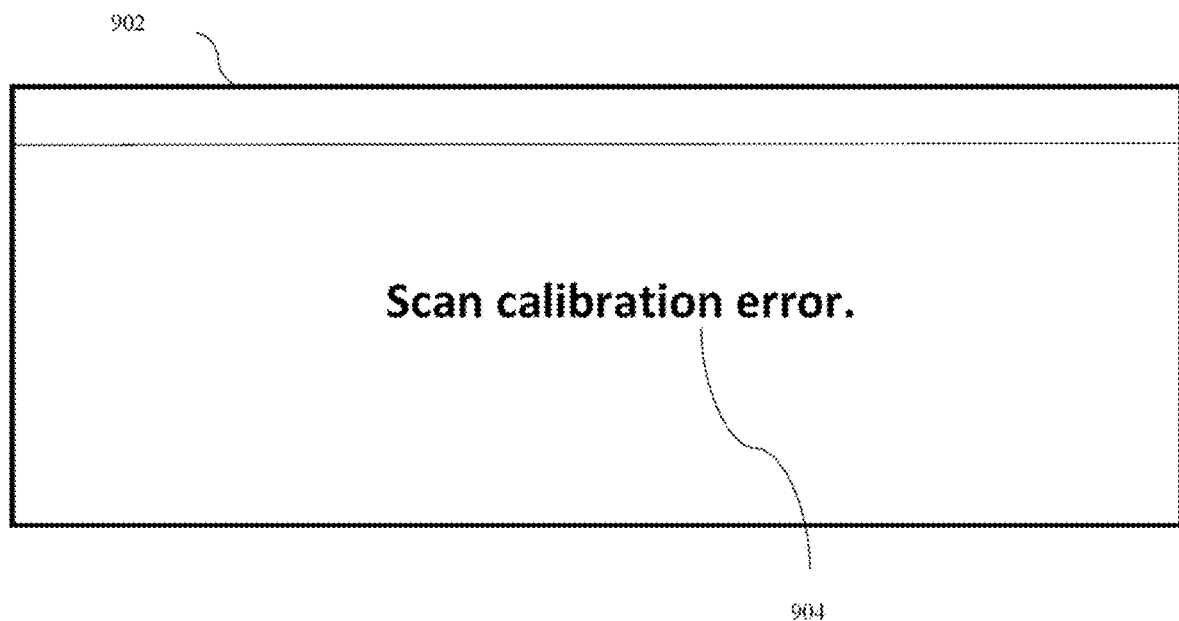
FIG. 9 shows an illustration of an example of one type of visual alert in some embodiments.

In some embodiments, the computer-implemented method can send an alert upon determining that the number of contrast blocks is not greater than the threshold pass value. The alert in some embodiments can be sent as an alarm that can include an audible sound and/or a graphical user interface window on a display that is part of the computer processing system 150 or other computer display. FIG. 9 illustrates one type of alert as a graphical user interface window 902 along with an alert message such as the example message shown in FIG. 9. Any other user-configurable message can be displayed and other types of alerts known in the art can be issued. For example, in some embodiments, flashing lights can be activated to alert the technician to a problem in the reconstruction. In some embodiments, the visual alert can be combined with an audible alert. The technician can then adjust either the scan or the calibration parameters of the CT scanner and rescan the object. This can advantageously help identify issues during automated scanning, for example. In some embodiments, the blurry reconstruction quality can be due to incorrect calibration parameters. In some embodiments, the reconstruction quality control is performed on a per scan basis.

One or more advantages of one or more features can include for example: a fully automatic process that eliminates manual determination of reconstruction quality, automatic detection of wrong or outdated calibration parameters used for the CT reconstruction, providing a warning/signal in an automated process to change the calibration, providing a warning/signal in the automatic process that a scan is blurry and should be performed again, improved reconstructed image quality, immediate determination of scanning error, determination of scanning error per scan, improved quality control at a per scan level, each scan is checked for quality, faster determination of scanning error, and automatic determination of scanning error.

Figure 10:
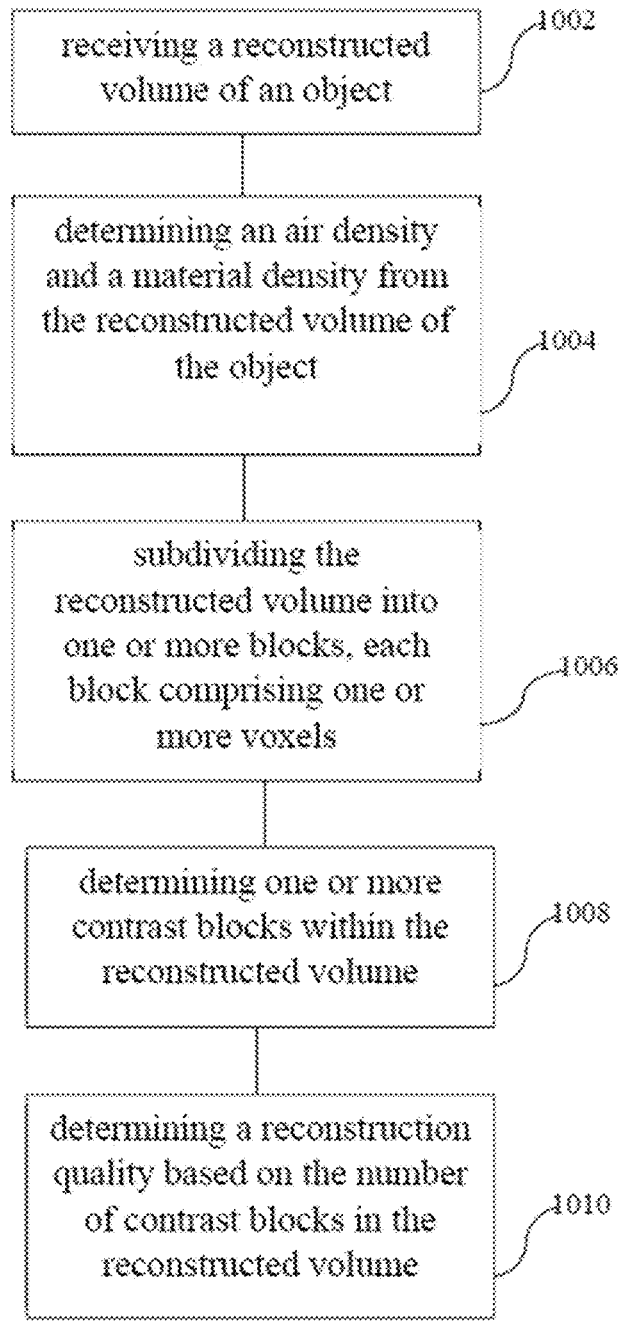
FIG. 10 shows a flow chart of a method in some embodiments.

FIG. 10 illustrates an example in some embodiments of a computer-implemented method of reconstruction quality control that can include receiving a reconstructed volume of an object at 1002, determining an air density and a material density from the reconstructed volume of the object at 1004, subdividing the reconstructed volume into one or more blocks, each block can include one or more voxels at 1006, determining one or more contrast blocks within the reconstructed volume at 1008, and determining a reconstruction quality based on the number of contrast blocks in the reconstructed volume at 1010. Some embodiments include a processing system for reconstruction quality control that can include a processor, a computer-readable storage medium including instructions executable by the processor to perform steps including: receiving a reconstructed volume of an object; determining an air density and a material density from the reconstructed volume of the object; subdividing the reconstructed volume into one or more blocks, each block comprising one or more voxels; determining one or more contrast blocks within the reconstructed volume; and determining a reconstruction quality based on the number of contrast blocks in the reconstructed volume.

Other features in some embodiments of the system, method, or instructions can also include the reconstructed volume is a CT reconstructed volume. In some embodiments, the object can be a dental impression. In some embodiments, the method can further include determining an air voxel count and a material voxel count in each of the one or more blocks. In some embodiments, the air voxel count can include the number of voxels having a density below or equal to the air density. In some embodiments, the material voxel count can include the number of voxels having a density above or equal to the material density. In some embodiments, a contrast block can include a block where both a fraction of air voxels and a fraction of material voxels is greater than a contrast block threshold value of all voxels within the block. In some embodiments, the reconstruction quality is good where the number of contrast blocks in the reconstructed volume is greater than a reconstruction pass value.

Figure 11:
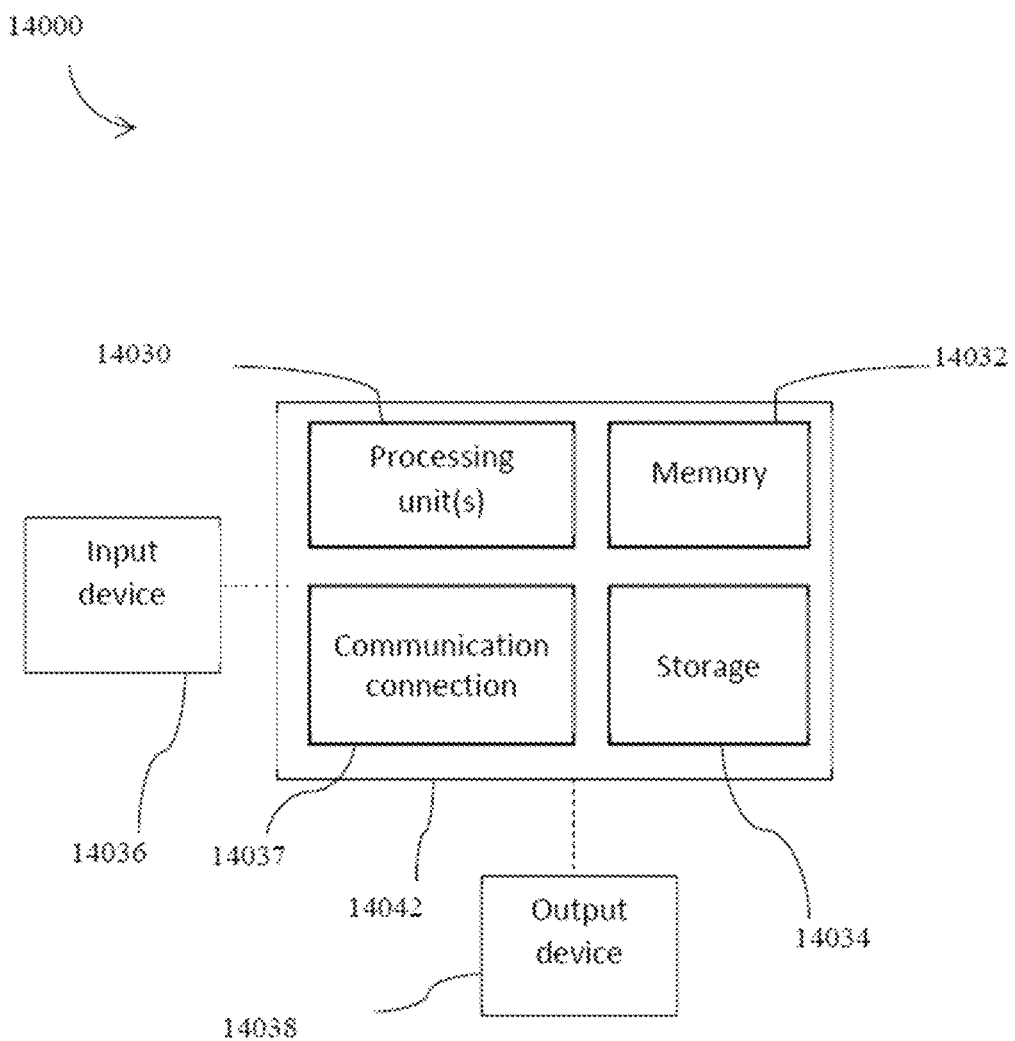
FIG. 11 shows a diagram of a system in some embodiments.

FIG. 11 illustrates a processing system 14000 in some embodiments. The system 14000 can include a processor 14030, computer-readable storage medium 14034 having instructions executable by the processor to perform one or more steps described in the present disclosure.

One or more of the features disclosed herein can be performed and/or attained automatically, without manual or user intervention. One or more of the features disclosed herein can be performed by a computer-implemented method. The features-including but not limited to any methods and systems-disclosed may be implemented in computing systems. For example, the computing environment 14042 used to perform these functions can be any of a variety of computing devices (e.g., desktop computer, laptop computer, server computer, tablet computer, gaming system, mobile device, programmable automation controller, video card, etc.) that can be incorporated into a computing system comprising one or more computing devices. In some embodiments, the computing system may be a cloud-based computing system.

For example, a computing environment 14042 may include one or more processing units 14030 and memory 14032. The processing units execute computer-executable instructions. A processing unit 14030 can be a central processing unit (CPU), a processor in an application-specific integrated circuit (ASIC), or any other type of processor. In some embodiments, the one or more processing units 14030 can execute multiple computer-executable instructions in parallel, for example. In a multi-processing system, multiple processing units execute computer-executable instructions to increase processing power. For example, a representative computing environment may include a central processing unit as well as a graphics processing unit or co-processing unit. The tangible memory 14032 may be volatile memory (e.g., registers, cache, RAM), non-volatile memory (e.g., ROM, EEPROM, flash memory, etc.), or some combination of the two, accessible by the processing unit(s). The memory stores software implementing one or more innovations described herein, in the form of computer-executable instructions suitable for execution by the processing unit(s).

A computing system may have additional features. For example, in some embodiments, the computing environment includes storage 14034, one or more input devices 14036, one or more output devices 14038, and one or more communication connections 14037. An interconnection mechanism such as a bus, controller, or network, interconnects the components of the computing environment. Typically, operating system software provides an operating environment for other software executing in the computing environment, and coordinates activities of the components of the computing environment.

The tangible storage 14034 may be removable or non-removable and includes magnetic or optical media such as magnetic disks, magnetic tapes or cassettes, CD-ROMs, DVDs, or any other medium that can be used to store information in a non-transitory way and can be accessed within the computing environment. The storage 14034 stores instructions for the software implementing one or more innovations described herein.

The input device(s) may be, for example: a touch input device, such as a keyboard, mouse, pen, or trackball; a voice input device; a scanning device; any of various sensors; another device that provides input to the computing environment; or combinations thereof. For video encoding, the input device(s) may be a camera, video card, TV tuner card, or similar device that accepts video input in analog or digital form, or a CD-ROM or CD-RW that reads video samples into the computing environment. The output device(s) may be a display, printer, speaker, CD-writer, or another device that provides output from the computing environment.

The communication connection(s) enable communication over a communication medium to another computing entity. The communication medium conveys information, such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Any of the disclosed methods can be implemented as computer-executable instructions stored on one or more computer-readable storage media 14034 (e.g., one or more optical media discs, volatile memory components (such as DRAM or SRAM), or nonvolatile memory components (such as flash memory or hard drives)) and executed on a computer (e.g., any commercially available computer, including smart phones, other mobile devices that include computing hardware, or programmable automation controllers) (e.g., the computer-executable instructions cause one or more processors of a computer system to perform the method). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media 14034. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, Python, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

In view of the many possible embodiments to which the principles of the disclosure may be applied, it should be recognized that the illustrated embodiments are only examples and should not be taken as limiting the scope of the disclosure.

What is claimed is:

1. A computer-implemented method of reconstruction quality control, comprising:
   receiving a reconstructed volume of an object;
   determining the number of contrast blocks within the reconstructed volume;
   upon determining the number of contrast blocks in the reconstructed volume is not greater than a reconstruction pass value, raising an alert; and
   upon determining the number of contrast blocks in the reconstructed volume is greater than a reconstruction pass value, allowing further processing.

2. The method of claim 1, wherein the reconstructed volume is a computed tomography (CT) reconstructed volume.

3. The method of claim 1, wherein the object is a dental impression.

4. The method of claim 1, further comprising determining an air voxel count and a material voxel count in one or more blocks in the reconstructed volume.

5. The method of claim 4, wherein the air voxel count comprises the number of voxels having a density below or equal to an air density.

6. The method of claim 4, wherein the material voxel count comprises the number of voxels having a density above or equal to a material density.

7. The method of claim 4, wherein a contrast block comprises a block where both a fraction of air voxels and a fraction of material voxels is greater than a contrast block threshold value of all voxels within the block.

8. The method of claim 1, wherein the reconstruction quality is good where the number of contrast blocks in the reconstructed volume is greater than a reconstruction pass value.

9. A system of reconstruction quality control, comprising:
   a processor;
      a computer-readable storage medium comprising instructions executable by the processor to perform steps comprising:
         receiving a reconstructed volume of an object;
         determining the number of contrast blocks within the reconstructed volume;
         upon determining the number of contrast blocks in the reconstructed volume is not greater than a reconstruction pass value, raising an alert; and
         upon determining the number of contrast blocks in the reconstructed volume is greater than a reconstruction pass value, allowing further processing.

10. The system of claim 9, further comprising determining an air voxel count and a material voxel count in one or more blocks in the reconstructed volume.

11. The system of claim 10, wherein the air voxel count comprises the number of voxels having a density below or equal to the air density.

12. The system of claim 10, wherein the material voxel count comprises the number of voxels having a density above or equal to the material density.

13. The system of claim 10, wherein a contrast block comprises a block where both a fraction of air voxels and a fraction of material voxels is greater than a contrast block threshold value of all voxels within the block.

14. The system of claim 9, wherein the reconstruction quality is good where the number of contrast blocks in the reconstructed volume is greater than a reconstruction pass value.

15. A non-transitory computer readable medium storing executable computer program instructions for reconstruction quality control, the computer program instructions comprising instructions for:
   receiving a reconstructed volume of an object;
   determining the number of contrast blocks within the reconstructed volume; upon determining the number of contrast blocks in the reconstructed volume is
   not greater than a reconstruction pass value, raising an alert; and
   upon determining the number of contrast blocks in the reconstructed volume is greater than a reconstruction pass value, allowing further processing.

16. The medium of claim 15, further comprising determining an air voxel count and a material voxel count in one or more blocks in the reconstructed volume.

17. The medium of claim 16, wherein the air voxel count comprises the number of voxels having a density below or equal to the air density.

18. The medium of claim 16, wherein the material voxel count comprises the number of voxels having a density above or equal to the material density.

19. The medium of claim 16, wherein a contrast block comprises a block where both a fraction of air voxels and a fraction of material voxels is greater than a contrast block threshold value of all voxels within the block.

20. The medium of claim 15, wherein the reconstruction quality is good where the number of contrast blocks in the reconstructed volume is greater than a reconstruction pass value.

* * * * *